United States Patent
Kobayashi

(10) Patent No.: US 11,112,354 B2
(45) Date of Patent: Sep. 7, 2021

(54) METHOD AND DEVICE FOR MEASURING CARBON CONCENTRATION IN SILICON SINGLE CRYSTAL

(71) Applicant: SUMCO CORPORATION, Tokyo (JP)

(72) Inventor: Shogo Kobayashi, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 0 days.

(21) Appl. No.: 16/963,581

(22) PCT Filed: May 23, 2019

(86) PCT No.: PCT/JP2019/020377
§ 371 (c)(1),
(2) Date: Jul. 21, 2020

(87) PCT Pub. No.: WO2020/017147
PCT Pub. Date: Jan. 23, 2020

(65) Prior Publication Data
US 2021/0055213 A1 Feb. 25, 2021

(30) Foreign Application Priority Data
Jul. 20, 2018 (JP) .............................. JP2018-136376

(51) Int. Cl.
*G01N 21/35* (2014.01)
*G01N 21/3563* (2014.01)

(52) U.S. Cl.
CPC . *G01N 21/3563* (2013.01); *G01N 2021/3595* (2013.01)

(58) Field of Classification Search
CPC ................... G01N 21/3566; G01N 2021/3595
See application file for complete search history.

(56) References Cited

U.S. PATENT DOCUMENTS

| | | |
|---|---|---|
| 5,444,246 A | 8/1995 | Kitagawara et al. |
| 2002/0011852 A1 | 1/2002 | Mandelis et al. |

(Continued)

FOREIGN PATENT DOCUMENTS

| | | |
|---|---|---|
| JP | H05-099844 A | 4/1993 |
| JP | H06-194310 A | 7/1994 |

(Continued)

OTHER PUBLICATIONS

ISR for PCT/JP2019/020377, dated Jul. 30, 2019.

*Primary Examiner* — Hugh Maupin
(74) *Attorney, Agent, or Firm* — Greenblum & Bernstein, P.L.C.

(57) ABSTRACT

A method for measuring carbon concentration in silicon single crystal according to the present invention includes a step of measuring a carbon concentration of a sample of silicon single crystal using FT-IR, a step of measuring a temperature of the sample during, prior to, or after the measurement of the carbon concentration of the sample, and steps of correcting a measured value Ycs of the carbon concentration of the sample based on the measuring temperature of the sample when the measured Ycs value of the carbon concentration of the sample is at or below $0.5 \times 10^{16}$ atoms/cm$^3$.

9 Claims, 8 Drawing Sheets

(56) References Cited

U.S. PATENT DOCUMENTS

| | | | |
|---|---|---|---|
| 2005/0229842 A1* | 10/2005 | Umeno | H01L 21/2605 117/84 |
| 2007/0178668 A1* | 8/2007 | Nakai | C30B 15/00 438/471 |
| 2007/0238189 A1* | 10/2007 | Kreszowski | G01N 21/3563 436/145 |
| 2009/0173884 A1 | 7/2009 | Nagai et al. | |
| 2015/0017086 A1 | 1/2015 | Nagai et al. | |
| 2018/0088042 A1 | 3/2018 | Ganagona et al. | |

FOREIGN PATENT DOCUMENTS

| | | |
|---|---|---|
| JP | H09-283584 A | 10/1997 |
| JP | 2001-118902 A | 4/2001 |
| JP | 2003-215028 A | 7/2003 |
| JP | 2004-253726 A | 9/2004 |
| JP | 2009-162667 A | 7/2009 |
| JP | 2015-17019 A | 1/2015 |

\* cited by examiner

METHOD AND DEVICE FOR MEASURING CARBON CONCENTRATION IN SILICON SINGLE CRYSTAL

FIELD OF THE INVENTION

The present invention relates to a method and a device for measuring carbon concentration in silicon single crystal, and specifically relates to a method and a device for measuring carbon concentration in silicon single crystal using FT-IR (Fourier Transform Infrared Spectroscopy).

BACKGROUND OF THE INVENTION

Silicon single crystal is widely used as a substrate material for a semiconductor device. Impurities included in silicon single crystal are an important element that influences quality of the semiconductor device. Due to the recent downsizing and greater integration of semiconductor devices, substitutional carbon Cs in silicon single crystal can also cause a leak defect or the like. Therefore, it is desirable to reduce the carbon concentration in single crystal as much as possible.

The majority of silicon single crystal is produced by the Czochralski method (CZ method), and the single crystal contains a large amount of carbon derived from the manufacturing process. However, according to the latest manufacturing technology, the carbon concentration in CZ silicon single crystal can be set at or below $1 \times 10^{16}$ atoms/cm$^3$. In order to evaluate such silicon single crystal having a low carbon concentration, it is necessary to accurately measure extremely low carbon concentrations in silicon single crystal.

FT-IR is widely used as a method for measuring the carbon concentration in silicon single crystal. For example, Patent Literature 1 describes a method for measuring substitutional carbon concentration in silicon single crystal using FT-IR. With this measurement method, a difference coefficient is calculated from an infrared absorption spectrum obtained from the silicon single crystal which is a measured object (sample) and an infrared absorption spectrum obtained from silicon single crystal (reference) that is manufactured with the same manufacturing method as the sample, that has roughly the same free carrier absorption, and that practically has no carbon. Then, using this difference coefficient, a difference absorption spectrum is found based on the infrared absorption spectra, and substitutional carbon concentration in the sample is determined from a distance between a base line and a peak of localized vibrational absorption of the substitutional carbon in the difference absorption spectrum.

Also, Patent Literature 2 describes that a carbon-free standard sample having an oxygen concentration lower than a measured silicon crystal is used in order to measure, using FT-IR, the carbon concentration in silicon crystal having a carbon concentration at or below $5 \times 10^{15}$ atoms/cm$^3$.

Patent Literature 3 describes that measurement accuracy of FT-IR is improved by reducing variation in measured values due to temperature differences by compensating for the temperature differences generated between a measurement chamber where infrared light is fired and a storage space for a measured sample that is located outside of a device.

RELATED ART

Patent Literature

Patent Literature 1: Japanese Patent Laid-open Publication No. H06-194310

Patent Literature 2: Japanese Patent Laid-open Publication No. H09-283584

Patent Literature 3: Japanese Patent Laid-open Publication No. H05-099844

SUMMARY OF THE INVENTION

Problems to be Solved by the Invention

However, when measuring extremely low carbon concentration in silicon single crystal using FT-IR, the measurement results may change daily even for the same measured sample, and reproducibility of the measurement results of the carbon concentration is poor.

Accordingly, the present invention provides a method and a device for measuring the carbon concentration in silicon single crystal that can accurately measure the carbon concentration even when the carbon concentration in silicon single crystal is extremely low.

Means for Solving the Problems

As a result of thorough research into causes of variation in measurement results of the carbon concentration in silicon single crystal, the inventors of the instant application found that when the carbon concentration in a measured sample is extremely low, specifically when the carbon concentration in silicon single crystal is at or below $0.5 \times 10^{16}$ atoms/cm$^3$, temperature dependency of the carbon concentration is increased and a measured value of the carbon concentration fluctuates according to differences in measuring temperature, even for the same measured sample.

The present invention is based on such technical knowledge and a method for measuring the carbon concentration in silicon single crystal according to the present invention includes: a step of measuring the carbon concentration of a sample of silicon single crystal using FT-IR, a step of measuring the temperature of the sample during, prior to, or after the measurement of the carbon concentration of the sample, and a step of correcting the measured value of the carbon concentration of the sample based on the measuring temperature of the sample when the measured carbon concentration of the sample is at or below $0.5 \times 10^{16}$ atoms/cm$^3$.

According to the present invention, the carbon concentration in silicon single crystal at a reference temperature can be accurately measured using FT-IR even when the carbon concentration in silicon single crystal is low.

In the present invention, the step of correcting the measured value of the carbon concentration of the sample preferably includes a step of calculating a correction amount for the carbon concentration based on a correction coefficient and the temperature difference between the reference temperature and the measuring temperature of the sample, and a step of calculating the carbon concentration of the sample at the reference temperature by adding the correction amount to the measured value of the carbon concentration. In particular, when the measured value of the carbon concentration of the sample is defined as Ycs, the measuring temperature of the sample is defined as T, the reference temperature of the sample is defined as $T_0$, the correction coefficient is defined as A, and the carbon concentration of the sample at the reference temperature $T_0$ is defined as Ycs', the step of correcting the measured value Ycs of the carbon concentration of the sample preferably calculates Ycs'=Ycs+ A×($T_0$−T), which is the carbon concentration of the sample at the reference temperature $T_0$. Accordingly, the carbon concentration in silicon single crystal at the reference temperature can be accurately obtained regardless of fluctuation in measurement environment temperature.

The method for measuring the carbon concentration in silicon single crystal according to the present invention preferably further includes a step of defining a value of the correction coefficient A based on the measured value (Ycs) of the carbon concentration of the sample at a plurality of measuring temperatures, prior to calculating the correction amount (ΔYcs) for the carbon concentration. Accordingly, measurement accuracy of the carbon concentration in silicon single crystal can be enhanced.

In the present invention, the correction coefficient (A) preferably is a value within a range of $0.011\times10^{16}$ to $0.014\times10^{16}$ (atoms/(cm$^3$·° C.)). Accordingly, the carbon concentration in silicon single crystal can be accurately obtained.

The method for measuring the carbon concentration in silicon single crystal according to the present invention preferably measures the temperature inside the measurement chamber where the sample is measured, and indirectly measures the temperature (T) of the sample by estimating the temperature (T) of the sample from the temperature inside the measurement chamber. Accordingly, the temperature of a sample can be measured with a simple configuration.

In addition, the device for measuring the carbon concentration in silicon single crystal according to the present invention includes: a carbon concentration measurer measuring the carbon concentration of the sample of the silicon single crystal using FT-IR; a first thermometer measuring the temperature of the sample during, prior to, or after the measurement of the carbon concentration of the sample; and a carbon concentration corrector correcting the measured value of the carbon concentration of the sample based on the measuring temperature of the sample when the measured carbon concentration of the sample is at or below $0.5\times10^{16}$ atoms/cm$^3$.

In the present invention, the carbon concentration corrector preferably includes a correction amount calculator calculating (ΔYcs=A×(T$_0$−T)), which is a correction amount for the carbon concentration based on the correction coefficient (A) and the temperature difference between the reference temperature (T$_0$) and the measuring temperature (T) of the sample, and a correction value calculator calculating (Ycs'=Ycs+ΔYcs), which is the carbon concentration of the sample at the reference temperature (T$_0$) by adding the correction amount (ΔYcs) to the measured value (Ycs) of the carbon concentration. Accordingly, the carbon concentration in silicon single crystal at the reference temperature can be accurately obtained regardless of fluctuation in measurement environment temperature.

The device for measuring the carbon concentration according to the present invention preferably further includes a second thermometer measuring the temperature inside the measurement chamber where the sample is measured, and the device indirectly measures the temperature (T) of the sample by estimating the temperature (T) of the sample from the temperature inside the measurement chamber. Accordingly, the temperature of a sample can be measured with a simple configuration.

Effect of the Invention

The present invention provides a method and a device for measuring carbon concentration in silicon single crystal that can accurately measure the carbon concentration even when the carbon concentration in silicon single crystal is extremely low.

MODE FOR CARRYING OUT THE INVENTION

In the following, a preferred embodiment of the present invention is described in detail with reference to the drawings.

Figure 1:
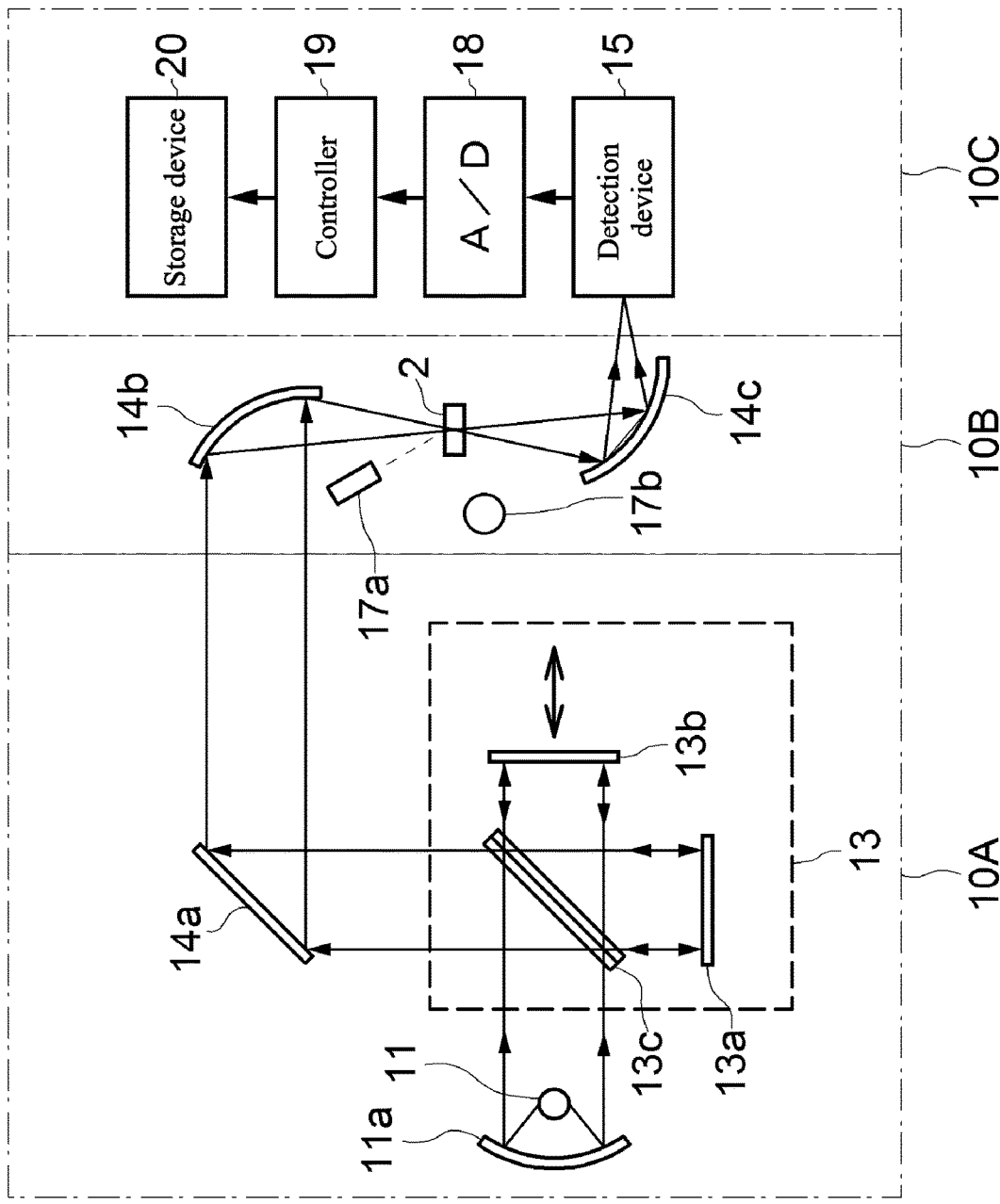
FIG. 1 is a plan view schematically illustrating an exemplary configuration of an FT-IR device used for a method for measuring carbon concentration in silicon single crystal according to the present invention.

FIG. 1 is a plan view schematically illustrating an exemplary configuration of an FT-IR device used for a method for measuring carbon concentration in silicon single crystal according to the present invention.

As shown in FIG. 1, an FT-IR device 1 is a device suitable for measuring substitutional carbon Cs in silicon single crystal. the FT-IR device 1 includes an infrared lamp 11 as a light source provided inside a spectroscopic chamber 10A; an interferometer 13 that emits interference fringes of infrared light of the infrared lamp 11; a flat mirror 14a and a concave mirror 14b that guide the interference fringes of the infrared light from the interferometer 13 to a sample 2 inside a measurement chamber 10B connected to the spectroscopic chamber 10A; a detection device 15 that detects transmitted light and reflected light of the interference fringes of the infrared light fired onto the sample 2; a concave mirror 14c that guides to the detection device 15 the transmitted light and the reflected light of the interference fringes of the infrared light fired onto the sample 2; an A/D converter 18 that digitally converts output (interferogram) from the detection device 15; a controller 19 that performs overall control of the device and calculation such as Fourier transform; and a storage device 20 that stores measured IR spectra. The detection device 15, the A/D converter 18, the controller 19, and the storage device 20 are provided inside a control chamber 10C connected to the measurement chamber 10B.

In addition, the FT-IR device 1 according to the present embodiment includes a pyrometer 17a (first thermometer) that measures without contact the temperature of the sample 2 placed inside the measurement chamber 10B, and a temperature sensor 17b (second thermometer) that measures the temperature inside the measurement chamber 10B.

After being converted to a digital signal by the A/D converter 18, the interferogram detected by the detection device 15 is imported into the controller 19, and the IR spectrum is obtained by performing the calculation such as Fourier transform using a similar detection output from a reference sample or an output without the sample as a background. The IR spectrum is stored in the storage device 20.

Figure 2:
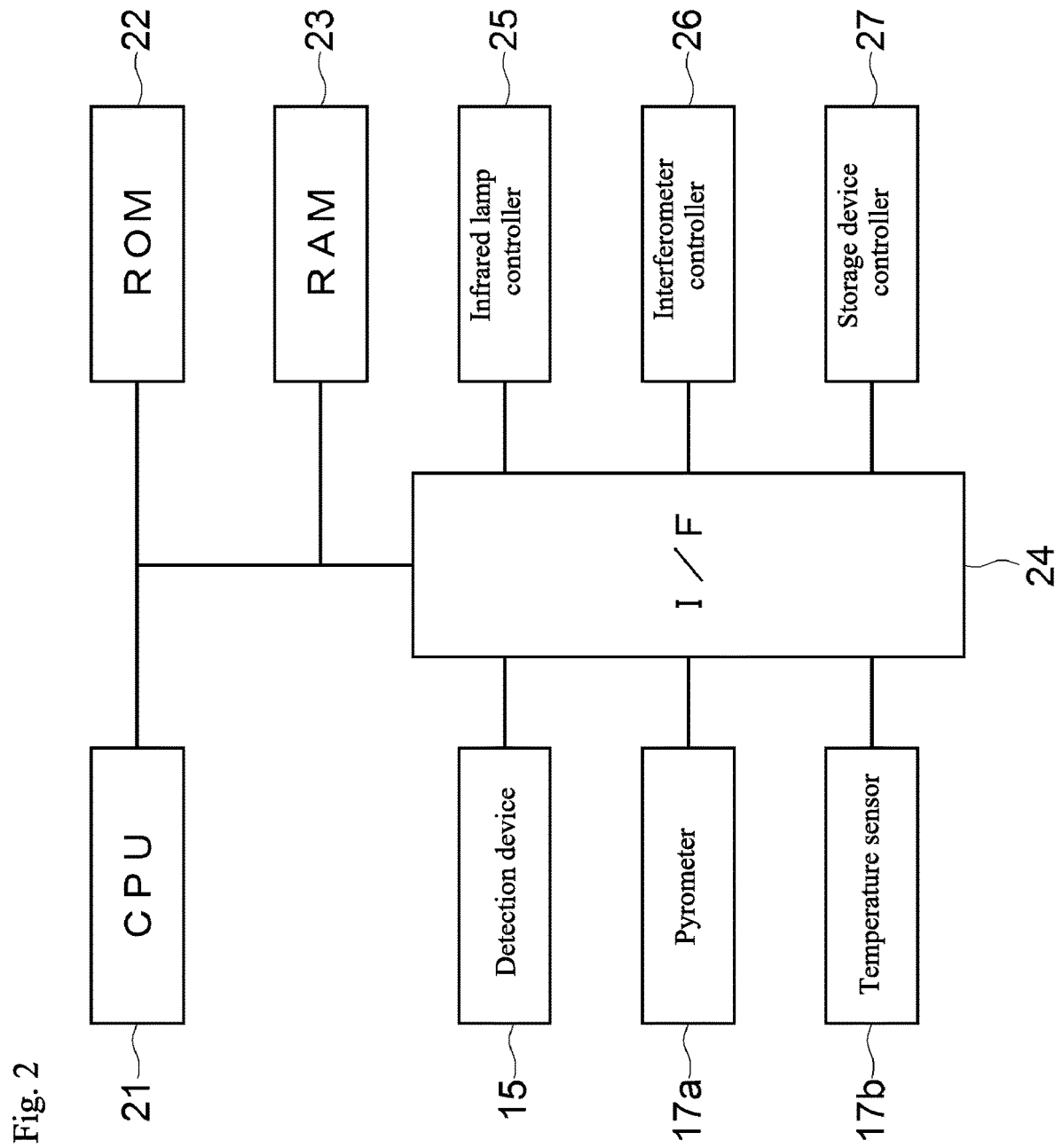
FIG. 2 is a block diagram schematically illustrating a configuration of a controller of the FT-IR device.

FIG. 2 is a block diagram schematically illustrating a configuration of the controller 19 of the FT-IR device.

As shown in FIG. 2, the controller 19 of the FT-IR device 1 includes a CPU 21 that performs overall control of the device and also performs the calculation such as Fourier transform with respect to the interferogram which is an output from the detection device 15; a ROM 22 that stores overall control content of the device; a RAM 23 that temporarily stores necessary information such as a size of the sample 2, a measurement mode, and a measurement condition, and output data of the detection device 15, and the like; and an interface 24.

The detection device 15, the pyrometer 17a, and the temperature sensor 17b and the like are connected to an input side of the interface 24 via the A/D converter (not shown in the drawing). Also, an infrared lamp controller 25, an interferometer controller 26, a storage device controller 27, and the like are connected to an output side of the interface 24 via a D/A converter (not shown in the drawing). Although not shown in the drawing, a console for inputting the measurement condition and the like is connected to the interface 24.

In the measurement of the sample 2, first, the infrared lamp 11 is turned on, and the interferometer 13, the detection device 15, and the like are put in an operation start mode. In addition, purge gas such as nitrogen gas is introduced into the spectroscopic chamber 10A and the measurement chamber 10B in order to remove carbon dioxide and water vapor in the air that absorbs infrared light very well.

Diverging light from the infrared lamp 11 is turned into parallel light by a collimating mirror 11a and then enters a beam splitter 13c inside the interferometer 13. The infrared light striking the beam splitter 13c is divided into reflected light and transmitted light, the reflected light is reflected by a fixed mirror 13a and returns toward the beam splitter 13c, and the transmitted light is reflected by a movable mirror 13b and returns toward the beam splitter 13c. These two lights are combined by the beam splitter 13c and interfere with each other, the interference light is condensed by the concave mirror 14b after being reflected using the flat mirror 14a, is transmitted or reflected by the sample 2, and is captured by the detection device 15 via the concave mirror 14c.

Next, the interference fringes of the infrared light (emitted light from the interferometer 13) are fired at the sample 2, the light transmitted or reflected by the sample 2 is detected by the detection device 15, and the IR spectrum is measured by performing the calculation such as Fourier transform and the like using the similar detected signal from the reference sample or the signal without the sample as the background. The IR spectrum is stored in the storage device 20.

Figure 3:
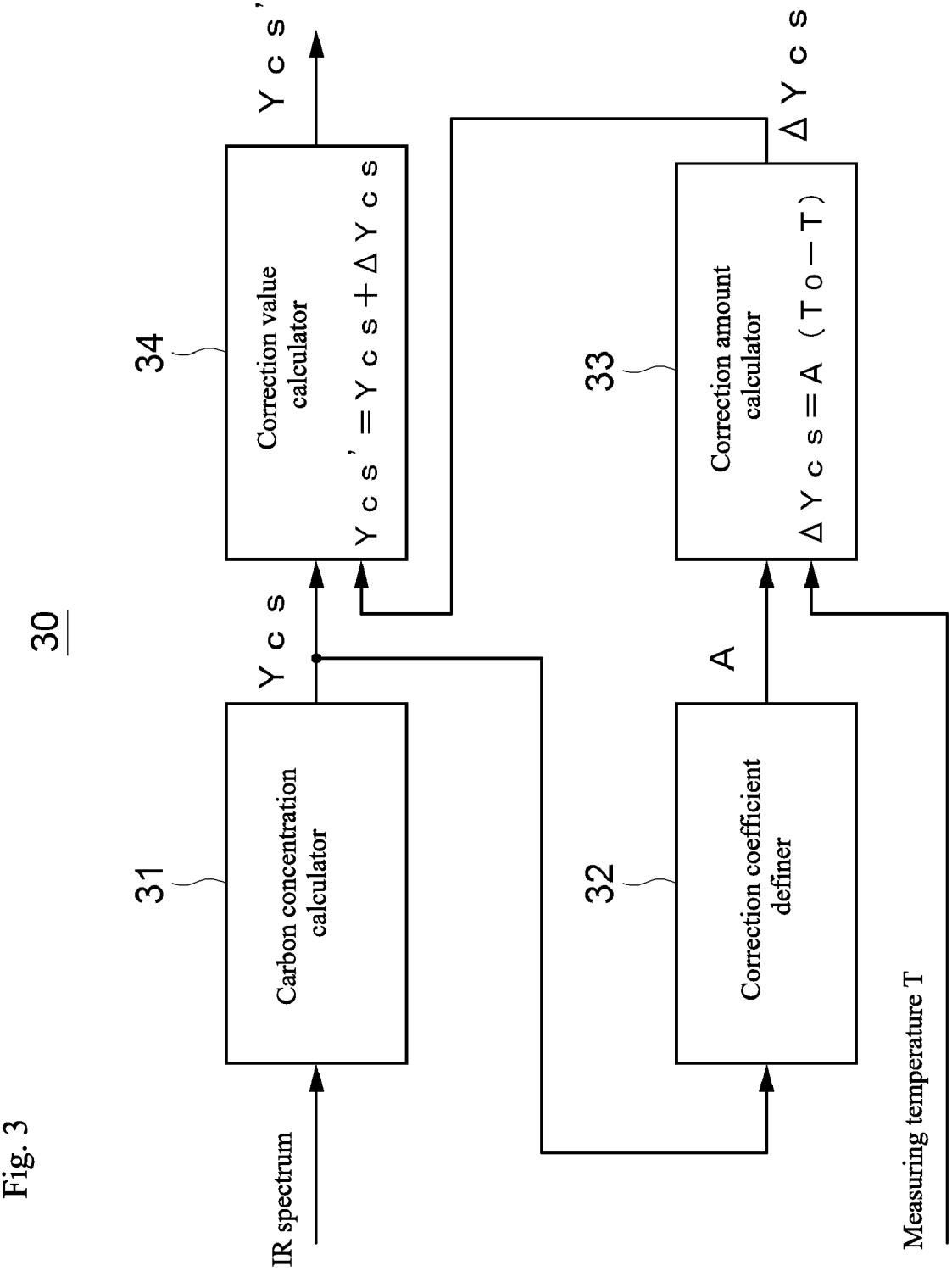
FIG. 3 is a functional block diagram of a carbon concentration measurer that is configured by the controller.

FIG. 3 is a functional block diagram of a carbon concentration measurer 30 that is configured by the controller 19.

As shown in FIG. 3, the carbon concentration measurer 30 includes a carbon concentration calculator 31 that quantifies, from the IR spectra of the measured sample and the reference sample, the concentration of substitutional carbon Cs included in the measured sample of the silicon single crystal; a correction coefficient definer 32 that defines the correction coefficient A based on the measured value Ycs of the carbon concentration in the measured sample at a plurality of measuring temperatures, which is found by the carbon concentration calculator 31; a correction amount calculator 33 that calculates $\Delta Ycs = A \times (T_0 - T)$, which is the carbon concentration correction amount based on the measuring temperature T provided by the pyrometer 17a and the temperature sensor 17b, the reference temperature $T_0$ (for example, 23° C.), and the correction coefficient A; and a correction value calculator 34 that calculates $Ycs' = Ycs + \Delta Ycs$, which is the carbon concentration at the reference temperature $T_0$. The correction coefficient definer 32, the correction amount calculator 33, and the correction value calculator 34 configure a carbon concentration corrector correcting the measured value of the carbon concentration of the measured sample based on the measuring temperature of the measured sample when the carbon concentration of the measured sample is at or less than the predetermined value.

In the present embodiment, the correction coefficient definer 32 preferably defines the correction coefficient A based on the measured value Ycs of the carbon concentration of the sample. In other words, it is preferable to use the correction coefficient that differs in accordance with the measured value Ycs of the carbon concentration. In this way, by making the correction coefficient A a variable value based on the measured value (Ycs) of the carbon concentration, the carbon concentration can be measured accurately.

When the measured value Ycs of the carbon concentration is greater than $1 \times 10^{16}$ atoms/cm$^3$, it is preferred to have the correction coefficient A=0. This is because when the measured value Ycs of the carbon concentration is greater than $1 \times 10^{16}$ atoms/cm$^3$, the temperature dependency of the measured value of the carbon concentration is low.

The correction coefficient A may be changed in stages as noted above or changed linearly in accordance with the change of the measured value Ycs of the carbon concentration. The correction coefficient A can be a value within a range of $0.011 \times 10^{16}$ to $0.014 \times 10^{16}$.

The FT-IR measurement noted above must be performed when the measuring temperature T of the sample is 20 to 26° C. This is because outside this temperature range, reliability of the measured value of the carbon concentration using the FT-IR device 1 is decreased.

The measuring temperature T of the sample is preferably the temperature while measuring the carbon concentration, however, the temperature may be the temperature immediately before measuring the carbon concentration, or the temperature immediately after measuring the carbon concentration. In addition, based on the measuring temperature prior to or after measurement of the carbon concentration, the measuring temperature of the sample while measuring the carbon concentration can be estimated. Also, instead of measuring the temperature of the sample directly, the temperature inside the measurement chamber 10B is measured by the temperature sensor 17b, and the measuring temperature T of the sample may be estimated from the temperature inside the measurement chamber 10B. An example may include estimating the measuring temperature T of the sample to be the same as the temperature inside the measurement chamber 10B. In other words, the measuring temperature T of the sample may be measured indirectly. According to this, the pyrometer 17a can be omitted and the temperature of the sample can be measured with a simple configuration.

Figure 4:
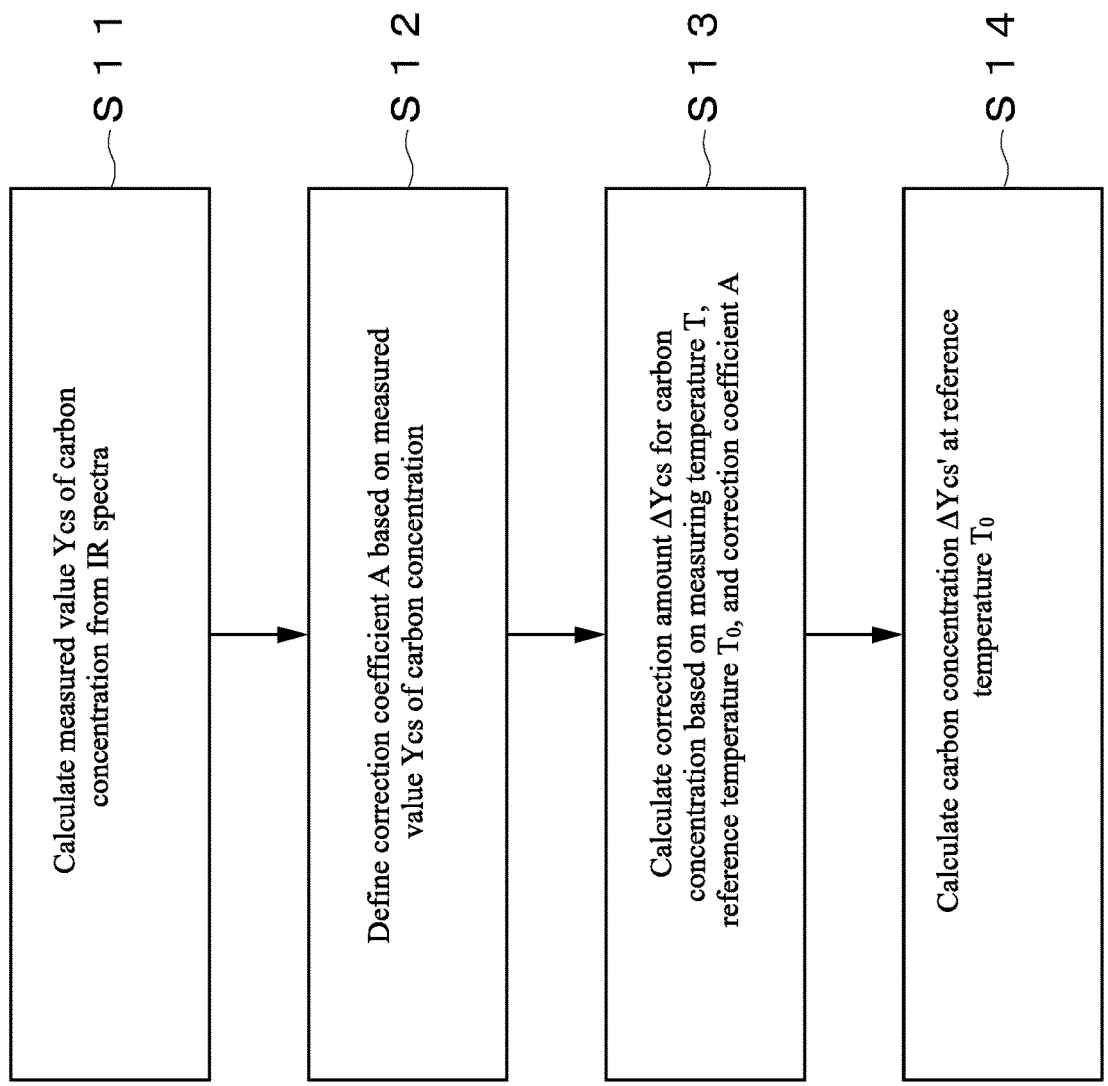
FIG. 4 is a flow chart illustrating a method for correcting the carbon concentration.

FIG. 4 is a flow chart illustrating a method for correcting the carbon concentration.

As shown in FIG. 4, in correcting the carbon concentration, the concentration of the substitutional carbon Cs of the silicon single crystal is quantified from the IR spectra of the reference sample and the measured sample to calculate the measured value Ycs of the carbon concentration of the measured sample (step S11). Next, the correction coefficient A is defined based on the measured value Ycs of the carbon concentration of the measured sample (step S12). The method for defining the correction coefficient A is described above, and when the measured value of the carbon concentration is at or greater than $0.5 \times 10^{16}$ atoms/cm$^3$, correction of the carbon concentration is not performed since the correction coefficient is set as zero.

Next, the carbon concentration correction amount $\Delta Ycs = A \times (T_0 - T)$ is calculated based on the correction coefficient A, the reference temperature $T_0$, and the measuring temperature T of the measured sample (step S13). Then, the measured value Ycs of the carbon concentration of the measured sample is corrected, and the carbon concentration at the reference temperature $T_0$ is calculated as $Ycs' = Ycs + \Delta Ycs$ (step S14). When the measured value of the carbon concentration is at or greater than $0.5 \times 10^{16}$ atoms/cm$^3$, $Ycs' = Ycs$. The reference temperature $T_0$ can be set at any temperature in the range of 20° C. to 32° C., and can be set at 23° C. for example.

Normally, the FT-IR measurement is performed inside a clean room, and the temperature in the clean room is generally kept constant. However, the temperature fluctuates slightly due to the influence of outside air temperature, and the like. In other words, the measurement environment temperature is not always constant, and seasonal variation and daily variation are observed. Conventionally, in the measurement of the carbon concentration with respect to a silicon single crystal with relatively high carbon concentration, even when the measurement environment temperature fluctuates slightly, no variation is found in the measurement results. However, when the carbon concentration in silicon single crystal is low, the fluctuation in the measurement environment temperature becomes a factor that causes the measured value of the carbon concentration to fluctuate, and the measured value of the carbon concentration in silicon single crystal varies greatly due to the fluctuation in the measurement environment temperature.

However, in the present embodiment, the measured value of the carbon concentration is corrected according to a change in temperature of the sample influenced by the measurement environment temperature, and therefore the carbon concentration in silicon single crystal at the reference temperature $T_0$ can be measured accurately. In addition, the correction coefficient changes according to the size of the measured value of the carbon concentration, and therefore the carbon concentration in silicon single crystal can be measured more accurately.

In the above, a preferred embodiment of the present invention is described. However, the present invention is not limited to the above-described embodiment and various modifications are possible within the scope of the invention, and it goes without saying that those modifications are also included within the scope of the present invention.

For example, in the above-described embodiment, the carbon concentration measurer 30 is configured by the controller 19 of the FT-IR device 1, however, the carbon concentration measurer 30 may also be configured by a computer that is separate from the FT-IR device 1.

EXAMPLES

Four samples of silicon single crystal #1 to #4 are prepared and a variation rate of the carbon concentration for each sample is measured when the measuring temperature changes within a range of 22.5±2° C.

Figure 5:
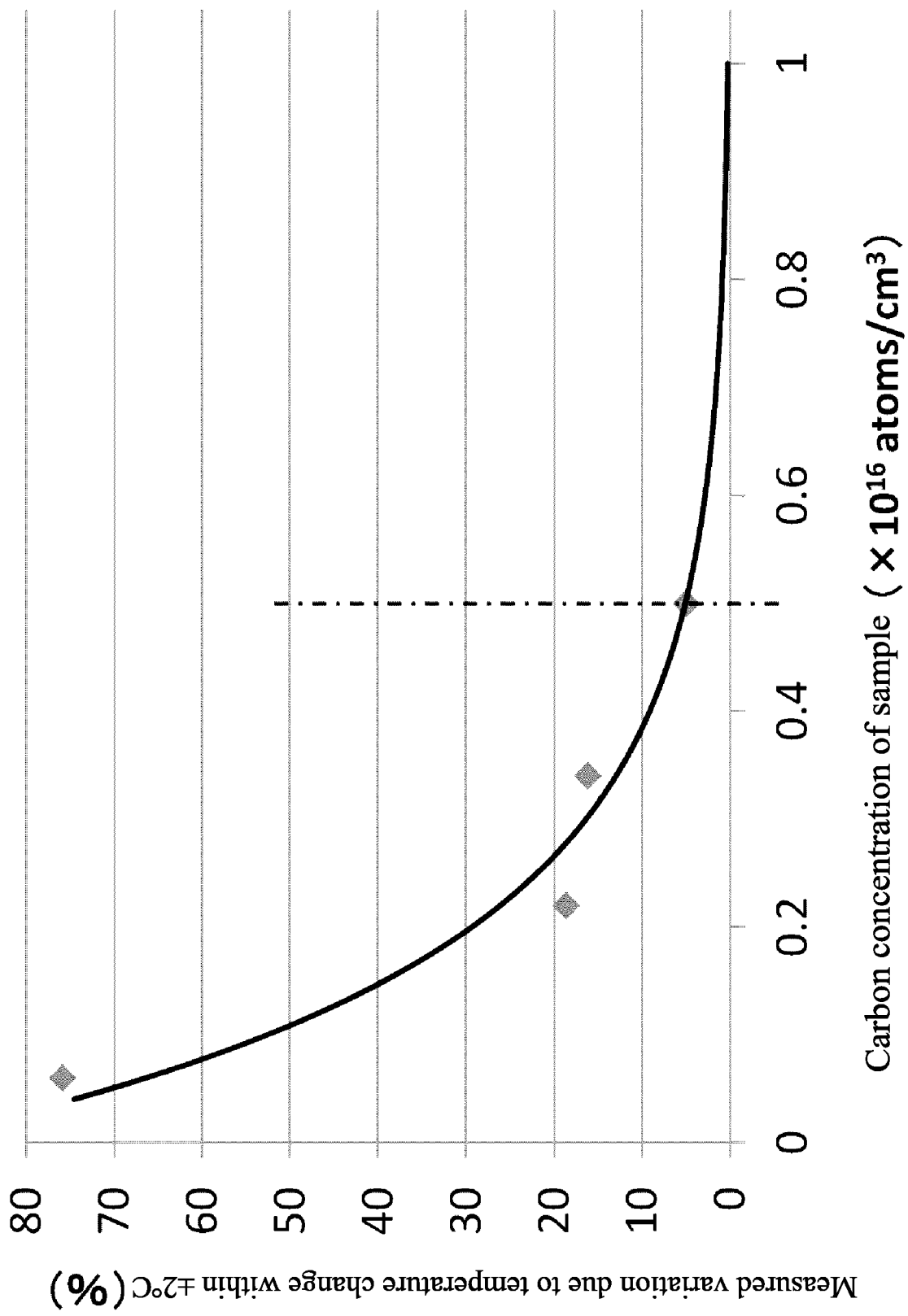
FIG. 5 is a graph showing a variation rate of the carbon concentration for each sample when measuring temperatures for samples of silicon single crystals #1 to #4 change within a range of 22.5±2° C.

FIG. 5 is a graph showing the variation rate of the carbon concentration for each sample when the measuring temperature for the samples of silicon single crystal #1 to #4 changes within a range of 22.5±2° C. and the horizontal axis indicates the carbon concentration ($\times 10^{16}$ atoms/cm$^3$) when the measuring temperature for the samples #1 to #4 is 22.5° C., and the vertical axis indicates respective variation rates (%) of the carbon concentration for the samples when the temperature changes ±2° C.

As shown in FIG. 5, it is found that the lower the carbon concentration is, the more greatly the variation rate of the carbon concentration in silicon single crystal increases and grows exponentially. On the other hand, the variation rate of the carbon concentration is at or less than 5% when the carbon concentration is at or greater than $0.5 \times 10^{16}$ atoms/cm$^3$, and the temperature dependency is confirmed to be extremely low.

Next, the temperature dependency of the carbon concentration is checked by changing the measurement environment temperature when the carbon concentration in silicon single crystal is measured using FT-IR. It is a value for the temperature, measured by the pyrometer, of silicon single crystal during the FT-IR measurement when the measuring temperature is set at 21 to 24° C. As the samples for silicon single crystal, seven samples are prepared respectively for a sample having a carbon concentration less than $0.1 \times 10^{16}$ atoms/cm$^3$, a sample of $0.1 \times 10^{16}$ to $0.3 \times 10^{16}$ atoms/cm$^3$, and a sample of $0.3 \times 10^{16}$ to $0.5 \times 10^{16}$ atoms/cm$^3$.

Figure 6:
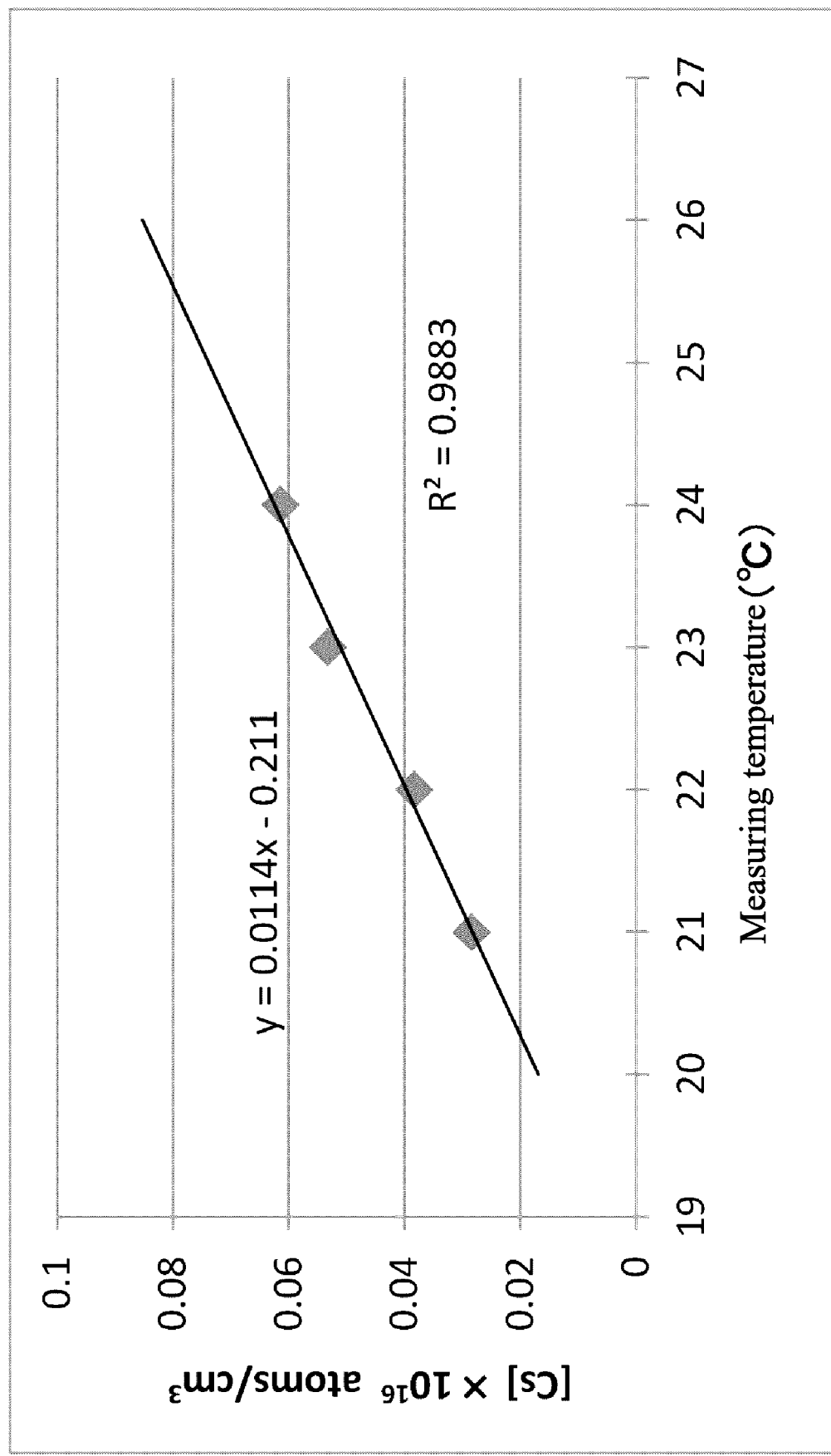
FIG. 6 is a graph showing temperature dependency of the carbon concentration when the carbon concentration is less than $0.1\times10^{16}$ atoms/cm$^3$.

FIG. 6 is a graph showing the temperature dependency of the carbon concentration when the carbon concentration is less than $0.1 \times 10^{16}$ atoms/cm$^3$. The horizontal axis indicates the measuring temperature (° C.) and the vertical axis indicates the carbon concentration ($\times 10^{16}$ atoms/cm$^3$) respectively. The plotted values in the graph are the average value of the carbon concentration for the seven samples at the respective temperature.

As shown in FIG. 6, there is a tendency of the carbon concentration to increase with an increase in the measuring temperature. A linear regression expression that indicates the relationship between the measuring temperature x and the carbon concentration y is $y = 0.0114x - 0.211$, and the correction coefficient is $A \approx 0.011 \times 10^{16}$. In addition, a coefficient of determination is $R^2 = 0.988$ and when the carbon concentration in single crystal is extremely low at less than $0.1 \times 10^{16}$ atoms/cm$^3$, it is found that there is a very strong correlation between the measuring temperature and the carbon concentration.

Figure 7:
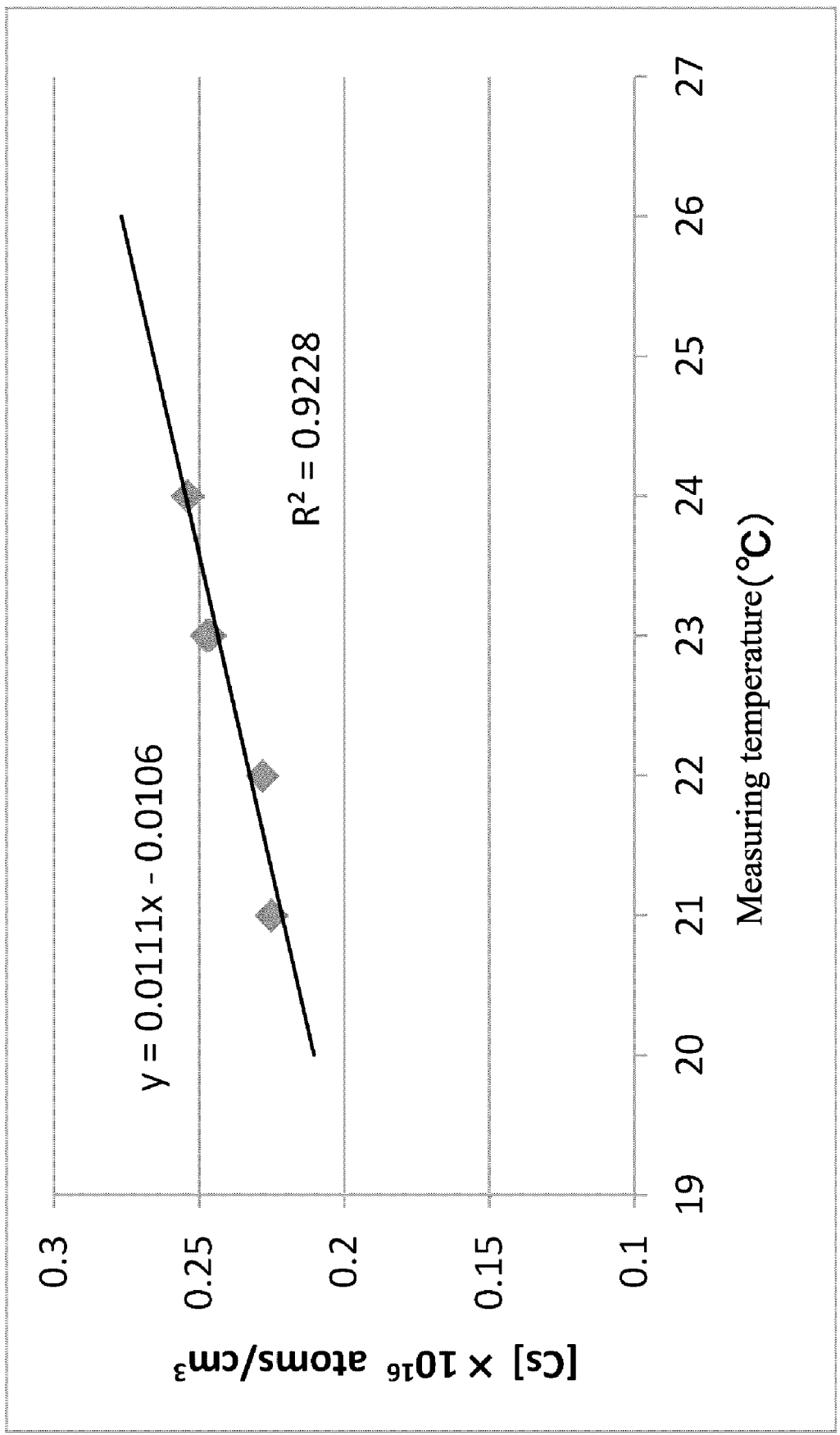
FIG. 7 is a graph showing temperature dependency of the carbon concentration when the carbon concentration is between $0.1\times10^{16}$ and $0.3\times10^{16}$ atoms/cm$^3$.

FIG. 7 is a graph showing the temperature dependency of the carbon concentration when the carbon concentration is between $0.1 \times 10^{16}$ and $0.3 \times 10^{16}$ atoms/cm$^3$. The horizontal axis indicates the measuring temperature (° C.) and the vertical axis indicates the carbon concentration ($\times 10^{16}$ atoms/cm$^3$) respectively. The plotted values in the graph are the average value of the carbon concentration for the seven samples at the respective temperature.

As shown in FIG. 7, there is a tendency of the carbon concentration to increase with an increase in the measuring temperature. A linear regression expression that indicates the relationship between the measuring temperature x and the carbon concentration y is $y = 0.0111x - 0.0106$ and the correction coefficient is $A \approx 0.011 \times 10^{16}$. In addition, the coefficient of determination is $R^2 = 0.923$ and when the carbon concentration in single crystal is low at between $0.1 \times 10^{16}$ and $0.3 \times 10^{16}$ atoms/cm³, it is found that there is a very strong correlation between the measuring temperature and the carbon concentration.

Figure 8:
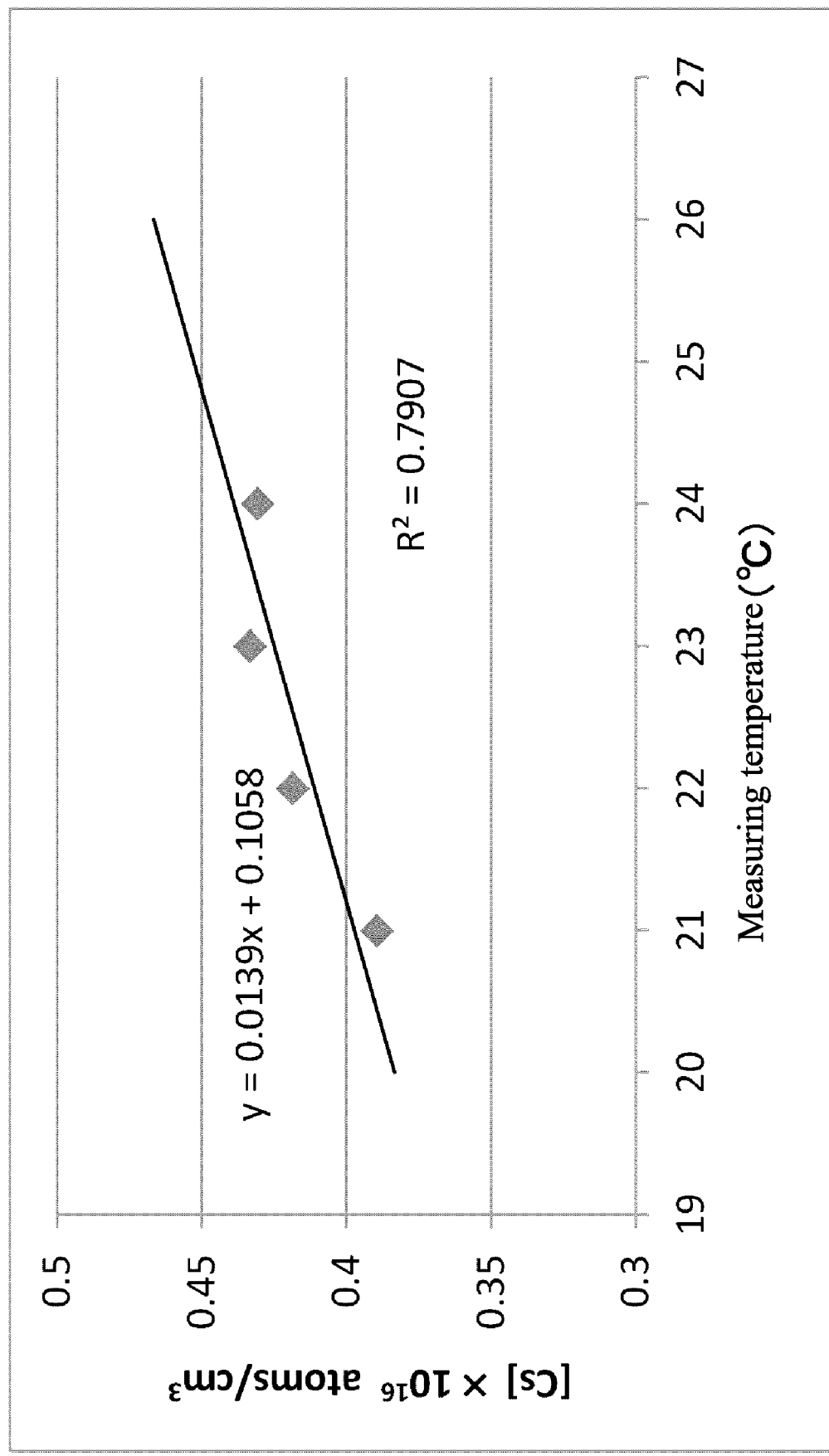
FIG. 8 is a graph showing temperature dependency of the carbon concentration when the carbon concentration is between $0.3\times10^{16}$ and $0.5\times10^{16}$ atoms/cm$^3$.

FIG. 8 is a graph showing the temperature dependency of the carbon concentration when the carbon concentration is between $0.3 \times 10^{16}$ and $0.5 \times 10^{16}$ atoms/cm³. The horizontal axis indicates the measuring temperature (° C.) and the vertical axis indicates the carbon concentration ($\times 10^{16}$ atoms/cm³) respectively. The plotted values in the graph are the average value of the carbon concentration for the seven samples at the respective temperature.

As shown in FIG. 8, the carbon concentration tends to increase with an increase in the measuring temperature. A linear regression expression that indicates the relationship between the measuring temperature x and the carbon concentration y is $y=0.0139x+0.1058$ and the correction coefficient is $A=0.014 \times 10^{16}$. In addition, the coefficient of determination is $R^2=0.791$ and when the carbon concentration in single crystal is low at between $0.3 \times 10^{16}$ and $0.5 \times 10^{16}$ atoms/cm³, it is found that there is a very strong correlation between the measuring temperature and the carbon concentration.

DESCRIPTION OF REFERENCE NUMERALS

1 FT-IR device (Carbon concentration measuring device)
2 Measured sample (Silicon single crystal)
10A Spectroscopic chamber
10B Measurement chamber
10C Control chamber
11 Infrared lamp
11a Collimating mirror
13 Interferometer
13a Fixed mirror
13b Movable mirror
13c Beam splitter
14a Flat mirror
14b Concave mirror
14c Concave mirror
15 Detection device
17a Pyrometer
17b Temperature sensor
18 Converter
19 Controller
20 Storage device
24 Interface
25 Infrared lamp controller
26 Interferometer controller
27 Storage device controller
30 Carbon concentration measurer
31 Carbon concentration calculator
32 Correction coefficient definer
33 Correction amount calculator
34 Correction value calculator

The invention claimed is:

1. A method for measuring carbon concentration in silicon single crystal comprising:
   measuring the carbon concentration of a sample of silicon single crystal using FT-IR;
   measuring a temperature of the sample during, prior to, or after the measurement of the carbon concentration of the sample; and
   correcting a measured value of the carbon concentration of the sample based on a measuring temperature of the sample when the measured carbon concentration of the sample is at or below $0.5 \times 10^{16}$ atoms/cm³.

2. The method for measuring the carbon concentration according to claim 1, wherein the correcting the measured value of the carbon concentration of the sample comprises:
   calculating a correction amount for the carbon concentration based on a correction coefficient and a temperature difference between the reference temperature and the measuring temperature of the sample; and
   calculating the carbon concentration of the sample at the reference temperature by adding the correction amount to the measured value of the carbon concentration.

3. The method for measuring the carbon concentration according to claim 2, wherein when the measured value of the carbon concentration of the sample is defined as Ycs, the measuring temperature of the sample is defined as T, the reference temperature of the sample is defined as $T_0$, the correction coefficient is defined as A, and the carbon concentration of the sample at the reference temperature $T_0$ is defined as Ycs', the correcting the measured value Ycs of the carbon concentration of the sample calculates Ycs'=Ycs+ $A \times (T_0-T)$, which is the carbon concentration of the sample at the reference temperature $T_0$.

4. The method for measuring the carbon concentration according to claim 2 further comprising defining a value of the correction coefficient based on the measured value of the carbon concentration of the sample at a plurality of measuring temperatures, prior to calculating the correction amount for the carbon concentration.

5. The method for measuring the carbon concentration according to claim 2, wherein the correction coefficient is a value within a range between $0.011 \times 10^{16}$ and $0.014 \times 10^{16}$ (atoms/(cm³·° C.)).

6. The method for measuring the carbon concentration according to claim 1, wherein the method measures the temperature inside a measurement chamber where the sample is measured, and indirectly measures the temperature of the sample by estimating the temperature of the sample from the temperature inside the measurement chamber.

7. A device for measuring carbon concentration in silicon single crystal comprising:
   a carbon concentration measurer measuring the carbon concentration of a sample of silicon single crystal using FT-IR;
   a first thermometer measuring the temperature of the sample during, prior to, or after the measurement of the carbon concentration of the sample; and
   a carbon concentration corrector correcting the measured value of the carbon concentration of the sample based on a measuring temperature of the sample when the measured carbon concentration of the sample is at or below $0.5 \times 10^{16}$ atoms/cm³.

8. The device for measuring the carbon concentration in silicon single crystal according to claim 7, wherein the carbon concentration corrector comprises:
   a correction amount calculator calculating a correction amount for the carbon concentration based on the correction coefficient and a temperature difference between the reference temperature and measuring temperature of the sample; and
   a correction value calculator calculating the carbon concentration of the sample at the reference temperature by adding the correction amount to the measured value of the carbon concentration.

9. The device for measuring the carbon concentration in silicon single crystal according to claim 7, the device further comprising a second thermometer that measures the temperature inside a measurement chamber where the sample is measured, wherein the device indirectly measures the temperature of the sample by estimating the temperature of the sample from the temperature inside the measurement chamber.

* * * * *